Dec. 22, 1964    C. VERBEEK    3,162,161
WELDING DEVICE
Filed Sept. 12, 1961    2 Sheets-Sheet 2
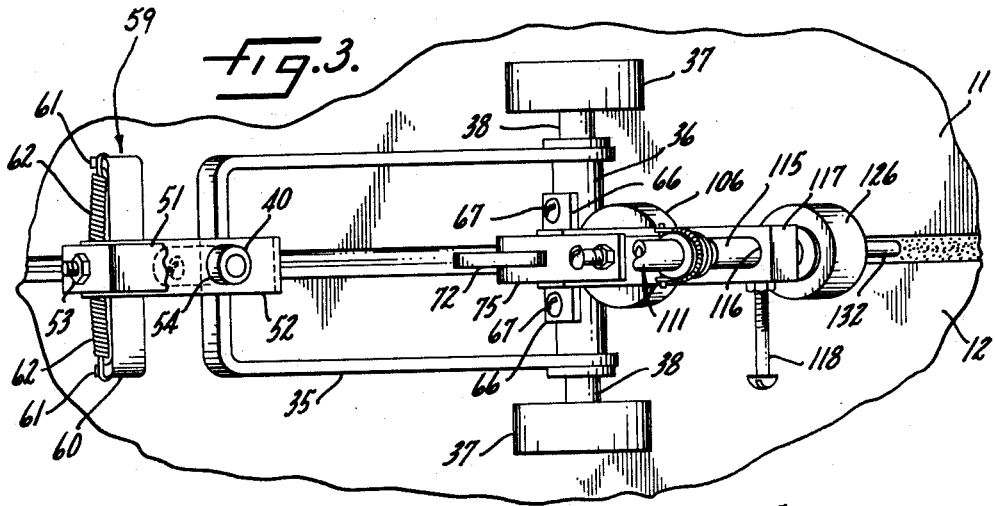
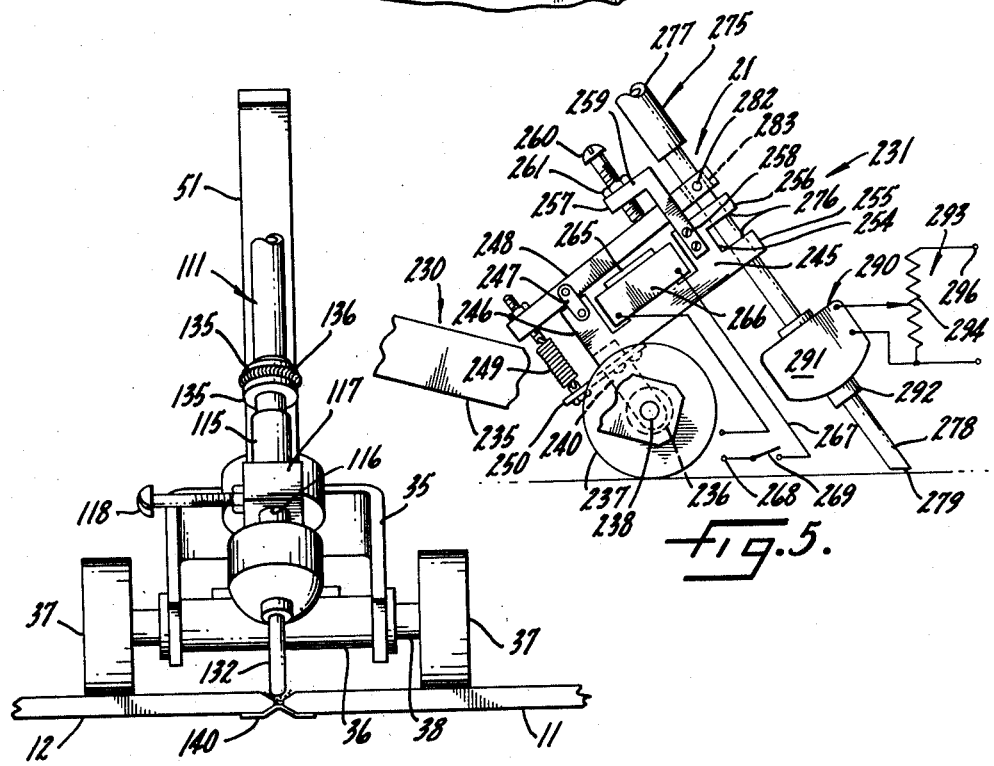
INVENTOR.
Clarence Verbeek,
BY
BYRON, HUME, GROEN & CLEMENT
Attorneys.

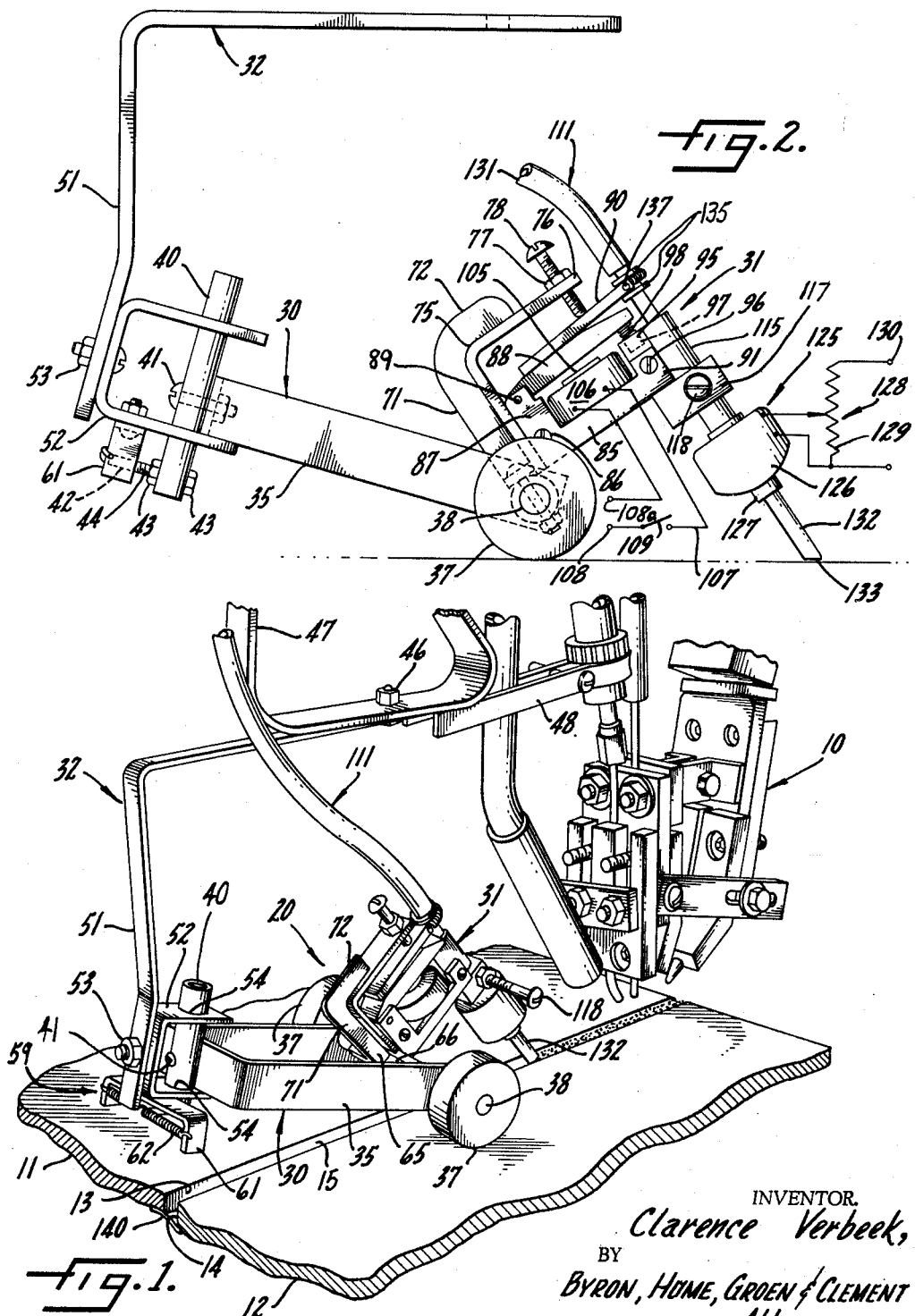

United States Patent Office 3,162,161
Patented Dec. 22, 1964

3,162,161
WELDING DEVICE
Clarence Verbeek, Lansing, Ill., assignor to Union Tank Car Company, Chicago, Ill., a corporation of New Jersey
Filed Sept. 12, 1961, Ser. No. 137,580
10 Claims. (Cl. 113—133)

This invention relates in general to welding. It deals more particularly with a device for facilitating the welding of adjoining members having poorly fit-up edges.

It is an object of the present invention to provide a new and improved welding device.

It is another object to provide a device for aiding in the welding of adjoining members.

It is still another object to provide a device for welding a seam between poorly fit-up edges of adjoining plates.

It is yet another object to provide a device which prevents welding burn-through.

It is still another object to provide a device for metering metallic particulate into the seam between poorly fit-up edges of adjoining plates.

It is still a further object to provide a device which insures the unimpeded flow of metallic particulate into a seam between the adjacent edges of adjoining plates prior to welding the plates together.

It is another object to provide a device which meters metallic particulate into the seam between poorly fit-up edges of adjoining plates and tamps the particulate into the seam.

It is yet another object to provide a device which levels and smooths the metallic particulate in the seam.

It is still another object to provide a device which operates to vary the rate of flow of metallic particulate into a seam.

The above and other objects are realized in accordance with the present invention by providing a new and improved device for depositing metallic particulate in the form of iron filings or powder into a seam between ill-fitting, adjoining edges of adjacent plates in contemplation of welding the plates together. Briefly, the invention contemplates a device which is adapted to be connected to and mounted in front of a continuous, automatic arc welder of conventional construction. The device includes a source of metallic powder or filings which will be referred to as metallic particulate. It provides means for delivering the particulate to the seam between the poorly fit-up adjacent edges of the adjoining plates, tamping the particulate in the seam, and smoothing it automatically.

The invention, both as to its organization and method of operation, taken with further objects and advantages thereof, will best be understood by reference to the following description taken in connection with the accompanying drawings, wherein several variations are shown:

FIGURE 1 is a perspective view of a device incorporating an automatic submerged arc welder and embodying the features of the present invention;

FIGURE 2 is a side elevational view of the device shown in FIGURE 1;

FIGURE 3 is a plan view of the device shown in FIGURE 1;

FIGURE 4 is a front elevational view of the device shown in FIGURE 1; and

FIGURE 5 is a view similar to FIGURE 2 showing another form of the device embodying the features of the present invention.

Referring now to the drawings and particularly to FIGURE 1, a welding assembly of well known construction is identified generally at 10 and is illustrated substantially in position for welding a pair of steel plates 11 and 12 together along a seam 15 defined by their adjacent edges 13 and 14 respectively. The welding assembly 10 might take the form of an automatic submerged arc welder such as the three-electrode welder shown in the drawings, or it might take other forms. For example, any single electrode automatic welder might be used as well as it might be a gas shielded type welder, for example, or any other type. As will be seen, the welding assembly 10 is adapted to be drawn substantially automatically in a conventional manner along the aforedescribed seam such that it uniformly welds the plates 11 and 12 together.

The welding assembly 10 is adapted to be associated with a device for depositing metallic particulate and embodying the features of the present invention. One variation of such a device, seen generally at 20 in FIGURE 1, is connected to the welding assembly 10 in leading relationship such that it is in position to deposit particulate into the seam left between the poorly fit-up plates in advance of the welding assembly itself. Another variation of the device embodying the features of the present invention is seen generally at 21 in FIGURE 5. The construction of each variation 20 and 21 on this invention is substantially identical with the exception of mechanical features relating to resilient means incorporated in the tamping construction of the device. For example, the device 20 employs a concept incorporating compressive resiliency to assist in the tamping while the device 21, seen in FIGURE 5, employs tensile resiliency in accomplishing the same end.

Referring specifically to the variation 20 of the device seen in FIGURE 1, as the welding assembly 10 proceeds automatically along the seam 15 a controlled amount of metallic particulate is deposited in the seam ahead of the welding assembly and the deposited particulate is tamped and smoothed to a substantially uniform depth in the seam by the device 20. Regulation of the amount of particulate deposited is readily maintained by the welding operator. In this light, the operator has control at all times over the rate of deposition along a seam where particulate must be substantially heavy or shut off entirely, as at a tack weld in the latter case, for example. He also has ready control of the amount of tamping utilized.

The device 20 includes a carriage 30 upon which is mounted for travel with the carriage a deposit control assembly 31 which meters the flow of particulate into the seam 15, tamps the deposited particulate and smooths the deposition. The device 20 further includes an arm assembly, seen generally at 32, which connects the carriage 30 to the welding assembly 10.

The carriage 30 includes a U-shaped frame 35 having a tubular member 36 rigidly supported between its free ends, preferably by welding. Wheels 37 are fixedly secured to axles 38 which are, in turn, rotatably mounted in the opposite ends of the tubular member 36, extending of course through aligned apertures (not shown) in the free ends of the frame 35.

A generally vertically extending length of pipe 40 is fixedly secured to the base of the U-shaped frame 35 by a conventional nut and screw fastener 41. As seen in FIGURE 2 a threaded pin 42 extends forwardly from the lower end of the pipe 40 and is fixedly secured thereto by lock nuts 43 turned on the threaded portion of the pin.

The leading arm assembly 32 is rigidly connected through a conventional nut and bolt fastener to an irregularly shaped member 47, which in turn is preferably welded to a clamp 48. The clamp 48 might be secured to the welding assembly end by any well known manner such as bolting, for example. At its leading end the arm assembly 32 is pivotally connected to the U-shaped frame 35 of the carriage 30. The carriage 30 is thus pivotally mounted in trailing relationship of the leading arm assembly 32 and, consequently, tends to align itself properly over the seam 15 as the carriage precedes the welding assembly during a welding operation.

The aforementioned pivotal relationship is established by an L-shaped member 51 which forms part of the arm assembly 32 and is rigidly secured to a C-shaped bracket 52 by a conventional nut and bolt fastener 53. The C-shaped bracket 52 has vertically aligned apertures in its upper and lower legs and these apertures 54 slidably encircle the vertically disposed pipe 40 rigidly secured to the base of the U-shaped frame 35 of the carriage 30. As will readily be seen, the result is that the carriage 30 is adapted for pivotal movement about the vertically aligned apertures 54 in the C-shaped bracket 52 on an axis defined by the pipe 40.

As best seen in FIGURES 1 and 3, a centering arrangement is shown generally at 59 and it is utilized to center the carriage 30 substantially under the arm assembly 32 and consequently over the seam 15 in which metallic particulate is to be deposited. The centering arrangement 59 includes a member 60 having downwardly extending arms 61. The member 60 is preferably welded to the base of the C-shaped bracket 52 and it carries between its downwardly extending arms a pair of coil tension springs 62. The coil tension springs 62 are connected at their inner extremities to the free end of the pin 44 which extends outwardly from the lowermost portion of the generally vertically extending pipe 40. The springs 62 are obviously of substantially identical strength.

The deposit control assembly 31, as best seen in FIGURES 1 and 2, includes a generally T-shaped element 65. The cross-piece 66 of the T-shaped element 65 is secured by conventional nut and bolt fasteners (see FIGURE 3) to the tubular member 36 welded between the free ends of the U-shaped frame 35 of the carriage 30. The generally T-shaped element 65 includes an upwardly extending leg which has its free ends 72 bent at right angles to the leg.

Rigidly secured, as by welding, within the confines of the leg 71 and its angularly extending free end 72, is a piece of strip steel 75, also bent at right angles to conform to the configuration of the leg. The strip 75 carries an adjustable stop member at its free end in the form of a conventionally threaded bolt 77 and stop nut 78. As will hereinafter be pointed out in detail, the stop member 77, 78 acts as a limit stop for controlling the tamping of the metallic particulate in the seam 15. Adjacent the lower end of the strip 75 and secured to its upper surface is an anchor member (not shown) which might take the form of a metal block and be welded to the upper surface of the strip.

Referring again to FIGURE 2, an identical pair of vertically extending plates 85 bracket the aforedescribed anchor member and might be fixedly secured to the anchor member by conventional metal screws 86. Forwardly extending portions 87 of the plates 85 are formed adjacent the lower ends of the plates and extend in parallel relationship to a point where an upwardly extending arm 88, preferably formed of laminated iron, is pivotally carried, as at 89, between them. The arm 88 has an extension 90 secured to its outer surface by conventional means which might be brazing, for example. The outer limit of travel of the arm 88 and its extension 90 is defined by the setting of the stop member 77, 78. As has been pointed out, this relationship then limits the amount of tamping of the metallic particulate.

The upper ends 91 of the upstanding plates 85 carry between them a seat member 95 secured to their inner surfaces by conventional metal screws 96. The seat member 95 extends forwardly of the upper ends 91 of the plates 85 and has a generally cylindrical recess 97 in its outermost surface. A compression coil spring 98 is seated in the recess 97 and tends to bias the arm 88 and its extension 90 outwardly against the stop member 77, 78.

The pivotally mounted arm 88 and its extension 90 are vibrated or reciprocated in a rhythmic fashion by a solenoid comprised of a solenoid core 105 about which a conventional solenoid winding 106 is effected. The winding 106 is energized through a circuit 107 from a source of A.C. current 108 and 108a by manipulation of a conventional two-way switch 109. When the A.C. electric power courses through the winding 106 at 60 cycles per second, for example, the laminated iron arm 88 is attracted to the core 105 against the bias of the coil compression spring 98 each time the sine wave of the 60 cycle per second current reaches the maximum and minimum points of the sine wave, and it is released each time the sine wave reaches its zero point. As pointed out, the result is a rhythmic vibration or reciprocation of the arm 88.

This rhythmic reciprocation of the arm 88 and its extension 90 is put to use in reciprocating the feed conduit assembly 111. The feed conduit assembly 111 is slidably mounted within a sleeve 115 which is adjustably secured within the bore 116 of a mounting block 117 secured by any conventional means to the forwardmost portion of the seat member 95. The sleeve 115 is adjustably held in the bore 116 by set screw 118 extending through the block 117 and into communication with the bore 116. As will readily be seen, the sleeve 115 is adapted to slide on the upper surface of the seat member 95 and, in fact, the seat member 95 might have a channel formed in its upper surface for such sliding contact.

Surrounding the sleeve 115 adjacent its lowermost end is a conventional electric coil, seen generally at 125. The coil 125 includes an electrical winding 126 wrapped about a non-conductive fitting 127 which is removably secured to the sleeve 115. An electrical circuit 128 including a rheostat 129 connects the winding 126 to a source of D.C. current 130. It will now be obvious, that the field strength set up by the winding 126 can be effected by manipulation of the rheostat 129 to increase or decrease the resistance in the circuit 126. As will hereinafter be described in detail, this of course effects the amount of metallic particulate allowed to pass through the feed conduit assembly 111.

The feed conduit assembly 111 includes a flexible hose 131 which might be formed of rubber. The hose 131 is in communication with a source of metallic particulate which is not shown but which might be carried in a bin immediately above the device 20 and supported on the welding assembly 10. A discharge tube 132, preferably formed of sheet metal, is snugly inserted in the end of the hose 131. The discharge end 133 of the tube might be cut on a bias, as shown, or it might have another configuration.

The discharge tube 132 carries a pair of spaced annular flanges 135 adjacent the juncture of the tube with the flexible hose 131. The extension 90 of the laminated iron arm 88 is loosely connected to the discharge tube 132 between these flanges 135 by a coil spring 136 stretched over the top of the tube between the flanges and secured to the extension 90 on either side of the tube, as by conventional securing means such as pins 137. It will now readily be seen that vibration or reciprocation of the arm 88 and its extension 90 will effect a reciprocation of the discharge tube 132 in the sleeve 115. This, as will hereinafter be pointed out, effects a tamping of the discharged metallic particulate in the seam to be welded.

To prepare for the welding of a seam 15 between a pair of poorly fit-up adjoining plates 11 and 12, first a strip of heat resisting tape 140, which might be plastic, is secured as seen in FIGURE 1 and 4, depending upon the configuration of the edges of the plate, in such a manner that a trough is formed along the length of the seam. The welding assembly 10 is positioned relative to the plates 11 and 12 in such a manner that its lines of travel will carry it along the seam. The metallic particulate depositing device 20 is secured to the welding assembly in the manner which has been hereinbefore described and which is graphically shown in FIGURE 1. The rubber hose 131 is connected to the source of metallic particulate in the form of filings or powder and the combination welding assembly and device 20 are moved along the seam.

As the combination moves along the seam, metal particulate passes down the hose 131 from its source, through the metal tube 132 and into the seam controlled by the magnetic field set up in the coil 125. The welding operator by varying the amount of the resistance through manipulation of the rheostat 129, as previously pointed out, can establish the strength of the magnetic field set up around the tube 132 and consequently vary the rate of deposition of the metallic particulate in the seam. He can lessen the flow in the vicinity of tack welds where the plates have been temporarily joined together and less powder is needed, for example, or shut it off altogether or increase it in areas where enlarged gaps exist between the plates.

At the same time that the rate of deposition of metallic particulate is being regulated, the operator, by closing the switch 109 associated with the circuit 107 which supplies A.C. current to the solenoid wrapping 106, sets up a tamping motion in the discharge tube 132 to pack the deposited metallic particulate in the seam. This tamping is effected by reciprocation of the laminated iron arm 88 and its extension 90 which are alternately drawn toward the core 105 of the solenoid and then pushed away from the solenoid into contact with the stop screw 77 by the compression spring 98. The discharge tube 132 reciprocates in the sleeve 115 under the control of the pivoted arm 88 and its extension 90 causing the discharge end 133 of the tube 132, which is pre-established in close relationship with the seam, to tamp the metal particulate between the plates and smooth it off to a predetermined level.

Referring now to FIGURE 5, a variation on the deposit control device 20 illustrated in FIGURES 1 through 4 is shown generally at 21, as has previously been pointed out. The device 21 is substantially identical to the device 20 with certain exceptions. In essence, it differs only in that the resiliently effected tamping is set up in such a manner that tensile rather than compressive resiliency is utilized. The end results are substantially the same, the difference in construction between the devices 20 and 21 being but a matter of choice.

The deposit control device 21 includes a carriage 230 upon which is supported a deposit control assembly, seen generally at 231. The carriage 230 is preferably connected through a leading arm assembly (not shown) in preceding relation to a welding assembly in the manner described in relation to the embodiment illustrated in FIGURES 1 through 4. Since this construction has previously been described in detail, it is not thought necessary that it be discussed again at length.

The carriage 230 includes a generally U-shaped frame 235, only part of which is shown in FIGURE 5. A tubular member 236 is preferably welded between the free ends of the frame 235. A pair of wheels 237 (only one of which is shown) are carried on axles which are rotatably mounted in the ends of the tubular member 236 and extend through aligned apertures in the free ends of the U-shaped frame 235.

The deposit control assembly 231 is rigidly secured to the transversely extending tubular member 236 through the medium of the generally upwardly extending support bracket 240, which might be welded to the transversely extending tubular member 236, for example. An irregularly shaped block 245 of steel, for example, forms the backbone of the deposit control assembly 231. It preferably is welded to the upper end of the support bracket 240.

The block 245 includes a lower, generally upwardly extending leg 246. Pivotally connected to the ends of the leg 246 are a pair of links 247 (only one of which is shown), which are also pivotally connected to an arm 248 extending generally transversely of the leg. The arm 248 is preferably formed of cast iron. The lowermost extremity of the arm 248 is connected through a tension coil spring 249 to a mounting plate 250 rigidly secured to the lowermost portion of the irregularly shaped block 245.

At the upper end of the irregularly shaped block 245 a Y-shaped portion 254, including upwardly extending legs 255 and 256, carries an L-shaped bracket 257 secured to the block by conventional metal screws 258. The shorter leg 259 of the L-shaped bracket 257 has a stop member associated therewith in the form of a stop screw 260 having on its threaded portion a stop nut 261. It will be seen that the coil spring 249 at the lower end of the block 245 tends to bias the arm 248 into engagement with the stop screw 260.

At about the mid-point of the block 245 forming the backbone of the deposit control assembly 231 is an extension 265 of the block which forms a solenoid core about which a conventional solenoid winding 266 is effected. The winding 266 is energized through a circuit 267 from a source of A.C. current 268 by manipulation of a conventional two-way switch 269. When A.C. current courses through the winding 266, at 60 cycles per second for example, the arm 248 is attracted to the core extension 265 against the bias of coil tension spring 249 every time the 60 cycle per second sine wave reaches the zero point and released at the maximum and minimum points of the sine wave. The result, which is substantially identical to that described in relation to the embodiment shown in FIGURES 1 through 4, is a rhythmic vibration or reciprocation of the arm 248 between the end of the extension 265 and the stop screw 260.

This rhythmic vibration or reciprocation of the arm 248 is again put to use in vibrating a feed conduit assembly 275 which is slidably mounted in the aligned bores 276 formed in the legs 255 and 256 of the U-shaped portion 254 of mounting block 245.

The feed conduit assembly 275 includes a flexible hose 277 which might be rubber. The hose 277 is in communication with a source of metallic particulate. A discharge tube 278 is snugly inserted in the hose 277 and the discharge end 279 of the tube is cut on a bias as shown, although it might be otherwise.

The discharge tube 278 is secured adjacent its juncture with the flexible hose 277 to the upper or free end of the cast iron arm 248. This connection is effected by a pair of stub pins 282 (only one of which is shown) which extend outwardly from the side of the discharge tube 278 within the confines of an aperture 283 passing through the end of the cast iron arm 248 and are seated in bearing relationship in bearing holes in the sides of the arm. The result is a pivotal connection between the stop screw 260 and the solenoid core forming extension 265 effects a reciprocation of the discharge tube 278. This, in turn, provides tamping by the discharge end 279 of the tube 278 on the metallic particulate deposited in the seam about to be welded.

Mounted on the tube 278 adjacent its lower end is a conventional electric coil seen generally at 290. The coil includes a winding 291 wrapped on a fitting 292 which is removably secured to the tube. A circuit 293 including a rheostat 294 connects the winding 291 to a source of D.C. current seen at 296. It will, of course, be readily understood that variations of the resistance in the circuit 293 through the medium of the rheostat 294 will vary the strength of the field set up about the tube 278 and consequently vary the passage of metal particulate through the tube and into the seam about to be welded.

The use and operation of deposit control device 21 is identical to that described in relation to the first embodiment of this invention, shown in FIGURES 1 through 4. The operator can vary the rate of deposition of metallic particulate in the seam at his will. He can lessen the flow in the vicinity of tack welds, for example, shut it off altogether or increase it where the seam grows wide and a substantial gap exists. At the same time, by vibrating or reciprocating the tube 278 in the manner hereinbefore described the operator tamps the metallic particulate into the gap left between the plates and it is automatically smoothed off to a predetermined depth or level by the end 279 of the tube.

Utilization of a deposit control device such as has been described in relation to either of the foregoing variations of this invention (20 or 21) effects a substantial improvement in numerous ways over the metal powder depositing equipment presently known.

In utilizing either variation of the device described, for example, only one operator is needed to perform both the welding operation and the precedent metallic particulate deposition step. At the same time, particulate is deposited at a pre-established optimum distance ahead of the welding assembly which gives it little opportunity to be disturbed in any way before the seam is welded.

In every instance where metallic particulate deposition is desirable, as it is where the poorly fit-up edges of adjoining plates must be welded, the entire welding process is speeded up whereby substantial savings in time and expense are effected. At the same time the quality of the finished weld is greatly improved due to the fact that the deposition control device insures uniform depth of the particulate. In addition, the particulate is uniformly packed in the seam. Deposition, packing of the deposited particulate and smoothing off of the deposited and packed particulate in the seam is effected by what might be referred to as finger-tip control. In all respects, a superior welding operation is performed where metallic particulate deposition is required and it is performed more expeditiously and economically than heretofore realized possible.

While the several variations described herein are at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A device for depositing metallic particulate in a seam precedent to its being welded by a welding assembly so as to provide superior quality welds comprising a carriage adapted to be secured to the welding assembly in advance of the assembly, a frame supported on said carriage, a feed conduit mounted on said frame for movement relative thereto and adapted to receive metallic particulate from a source and deliver it to the seam, means mounted on said conduit for metering the flow of particulate deposited in the seam and means mounted on said frame for vibrating said conduit relative to said frame to tamp the deposited particulate into the seam and smooth the tamped particulate precedent to welding the seam.

2. The device of claim 1 further characterized in that said metering means comprises an electric coil adapted to be energized by D.C. current, controlled variations in the magnetic field set up by said coil permitting varying amounts of metallic particulate to be deposited in said seam.

3. The device of claim 2 further characterized in that said vibrating means includes an arm pivotally mounted on said frame and connected to said conduit, a solenoid mounted on said frame, said solenoid adapted to vibrate said arm and consequently said conduit when energized by A.C. current to tamp the deposited metallic particulate into the seam and smooth the tamped particulate.

4. A device for depositing metallic particulate in a seam to be welded in advance of a welding assembly including bracket means adapted to be secured to the welding assembly and extending forwardly of the assembly, a carriage pivotally secured to said bracket in line with and in advance of the welding assembly, a frame supported on said carriage, a feed conduit on said frame for movement relative thereto and adapted to receive metallic particulate from a source and deliver it to the seam, means mounted on said conduit for metering the flow of particulate deposited in the seam and means mounted on said frame for vibrating said conduit relative to said frame to tamp the deposited particulate into the seam and smooth the tamped particulate precedent to welding the seam.

5. The device of claim 4 further characterized in that said carriage is disposed in trailing relation to its pivotal connection with said bracket.

6. A device for depositing metallic particulate in a seam to be welded in advance of a welding assembly including bracket means adapted to be rigidly secured to the welding assembly and extend forwardly thereof, a carriage pivotally secured to said bracket in line with and in advance of the welding assembly, centering means connecting said carriage and said bracket for biasing said carriage into centered relationship over the seam, a frame supported on said carriage, a feed conduit mounted on said frame for movement relative thereto and adapted to receive metallic particulate from a source and deliver it to the seam, means mounted on said conduit for metering the flow of particulate deposited in the seam and means mounted on said frame for vibrating said conduit relative to said frame to tamp the deposited particulate into the seam and smooth the tamped particulate precedent to welding the seam.

7. The device of claim 6 further characterized in that said centering means comprises oppositely acting resilient means connecting said bracket to said carriage.

8. A device for depositing metallic particulate in a seam to be welded between poorly fit-up plates, in advance of a welding assembly, comprising bracket means adapted to be rigidly connected to the welding assembly in forwardly extending relation, a carriage having wheel means thereon and adapted to be supported by the plates being welded, said carriage being pivotally connected to said bracket means in trailing relation to said bracket and in advance of the welding assembly, a frame supported on said carriage, a feed conduit mounted on said frame for movement relative thereto and adapted to receive metallic particulate from a source and deliver it to the seam, means mounted on said conduit for metering the flow of particulate deposited in the seam, arm means movably mounted on said frame and connected to said feed conduit, resilient means on said frame tending to bias said arm in one direction and a solenoid mounted on said frame, said solenoid adapted to be supplied with A.C. current so as to intermittently draw said arm toward said solenoid against the bias of said last mentioned resilient means to reciprocate said feed conduit and tamp the deposited particulate into the seam precedent to welding the seam.

9. A welding agreement comprising a welding assembly adapted to be moved along a seam between adjoining plates to weld the plates together, bracket means connected to the welding assembly in forwardly extending relation, a carriage having wheel means thereon and adapted to be supported by the plates being welded, said carriage being pivotally connected to said bracket means in trailing relation and in advance of said welding assembly, a frame supported on said carriage, a feed conduit mounted on said frame for movement relative thereto and adapted to receive metallic particulate from a source and deliver it to the seam, means associated with said conduit for metering the flow of particulate deposited in the seam, and means mounted on said frame for vibrating said conduit relative to said frame to tamp the deposited particulate into the seam and smooth the tamped particulate prior to the seam being welded by the welding assembly.

10. A device for depositing metallic particulate in a seam precedent to its being welded by a welding assembly so as to provide superior quality welds comprising support means adapted to be secured to the welding assembly in advance of the assembly, a frame supported on said support means, a feed conduit mounted on said frame for movement relative thereto and adapted to receive metallic particulate from a source and delivered to the seam, means mounted on said conduit for metering the flow of particulate deposited in the seam and means mounted on said frame for vibrating said conduit relative to said frame to tamp the deposited particulate into the seam.

References Cited in the file of this patent

UNITED STATES PATENTS

| | | | |
|---|---|---|---|
| 2,395,723 | Chmielewski | Feb. 26, | 1946 |
| 2,398,355 | Bristol | Apr. 16, | 1946 |
| 2,401,198 | Stoody et al. | May 28, | 1946 |
| 2,726,620 | Meissner | Dec. 13, | 1955 |
| 2,794,110 | Griffith | May 28, | 1957 |
| 2,886,695 | Todd | May 12, | 1959 |
| 3,026,406 | Van der Blink | Mar. 20, | 1962 |
| 3,028,478 | Belopitov | Apr. 3, | 1962 |

UNITED STATES PATENT OFFICE
CERTIFICATE OF CORRECTION

Patent No. 3,162,161  December 22, 1964

Clarence Verbeek

It is hereby certified that error appears in the above numbered patent requiring correction and that the said Letters Patent should read as corrected below.

Column 2, line 6, for "as" read -- and --; column 4, line 72, for "lines" read -- line --; column 5, line 2, for "hole" read -- hose --.

Signed and sealed this 18th day of May 1965.

SEAL)
Attest:

ERNEST W. SWIDER
Attesting Officer

EDWARD J. BRENNER
Commissioner of Patents